US012564849B2

(12) United States Patent
Mauchle et al.

(10) Patent No.: US 12,564,849 B2
(45) Date of Patent: Mar. 3, 2026

(54) DENSE PHASE POWDER PUMP

(71) Applicant: GEMA SWITZERLAND GMBH, St. Gallen (CH)

(72) Inventors: Felix Mauchle, Abtwil (CH); Hanspeter Vieli, Goldach (CH)

(73) Assignee: GEMA SWITZERLAND GMBH, St. Gallen (CH)

( * ) Notice: Subject to any disclaimer, the term of this patent is extended or adjusted under 35 U.S.C. 154(b) by 633 days.

(21) Appl. No.: 17/850,220

(22) Filed: Jun. 27, 2022

(65) Prior Publication Data
US 2022/0323977 A1     Oct. 13, 2022

Related U.S. Application Data

(63) Continuation-in-part of application No. 16/487,326, filed as application No. PCT/EP2017/079817 on Nov. 20, 2017, now abandoned.

(30) Foreign Application Priority Data

Feb. 21, 2017    (DE) .......................... 102017103487.0

(51) Int. Cl.
B05B 7/14         (2006.01)
B65G 53/28        (2006.01)
B65G 53/52        (2006.01)

(52) U.S. Cl.
CPC ............ B05B 7/1459 (2013.01); B65G 53/28 (2013.01); B65G 53/52 (2013.01); *B05B 7/1486* (2013.01); *B65G 2201/042* (2013.01)

(58) Field of Classification Search
None
See application file for complete search history.

(56) References Cited

U.S. PATENT DOCUMENTS 3,260,285 A * 7/1966 Vogt .......................... B65B 1/16
                                                          53/436
5,301,878 A     4/1994 Sinclair et al.
                      (Continued)

FOREIGN PATENT DOCUMENTS

CN         103108819 A    5/2013
CN         104470640 A    3/2015
                (Continued)

OTHER PUBLICATIONS

First Chinese Office Action for Chinese Application No. 201780087077.9, dated Aug. 27, 20020, 17 pages.
                (Continued)

*Primary Examiner* — Binu Thomas
(74) *Attorney, Agent, or Firm* — Kinney & Lange, P.A.

(57)     ABSTRACT

The invention relates to a dense-phase powder pump for conveying coating powder from a first powder reservoir to a second downstream powder reservoir or to a downstream powder spray-coating gun or similar device for spraying coating powder. The dense-phase powder pump has at least one powder conveying chamber, which is/can be fluidically connected to the first powder reservoir via a powder inlet, and to the second powder reservoir or to the powder spray-coating gun or similar device for spraying coating powder via a powder outlet. At least one powder inlet valve is provided at the powder inlet and at least one powder outlet valve is provided at the powder outlet. According to the invention, in order to make the dense-phase powder pump less prone to require maintenance during operation and, in particular, to constantly guarantee a continuous and uniform conveying of the powder, regardless of the type of powder, the at least one powder inlet valve and/or the at least one powder outlet valve has/have an effective flow cross-section in the respective open state, which corresponds to at least (Continued)

35% of the effective flow cross-section of the at least one powder conveying chamber.

16 Claims, 4 Drawing Sheets

(56)                    References Cited

U.S. PATENT DOCUMENTS

| | | | |
|---|---|---|---|
| 2001/0003568 A1 | 6/2001 | Dietrich | |
| 2005/0095071 A1 | 5/2005 | Kleineidam et al. | |
| 2006/0193704 A1 | 8/2006 | Simontacchi | |
| 2007/0095945 A1 | 5/2007 | Keudell et al. | |
| 2008/0205999 A1* | 8/2008 | Rieger | B05B 7/1459 |
| | | | 406/96 |
| 2010/0034600 A1 | 2/2010 | Sanwald | |
| 2010/0278597 A1 | 11/2010 | Borzone | |
| 2016/0052000 A1* | 2/2016 | Mauchle | B05B 7/1404 |
| | | | 118/308 |
| 2017/0216859 A1 | 8/2017 | Mauchle | |

FOREIGN PATENT DOCUMENTS

| | | | |
|---|---|---|---|
| CN | 105142799 A | 12/2015 | |
| DE | 19611533 A1 | 9/1997 | |
| DE | 19959473 A1 | 6/2001 | |
| DE | 10261053 A1 | 7/2004 | |
| DE | 10353968 A1 | 7/2005 | |
| DE | 102004052949 A1 | 5/2006 | |
| DE | 102005006522 B3 | 8/2006 | |
| DE | 102007046806 A1 | 4/2009 | |
| DE | 102013205895 A1 | 10/2014 | |
| DE | 102013211536 A1 | 12/2014 | |
| EP | 1566352 A2 | 8/2005 | |
| EP | 1752399 A1 | 2/2007 | |
| EP | 2981365 A1 | 2/2016 | |
| WO | 2004087331 A1 | 10/2004 | |
| WO | 2005005060 A2 | 1/2005 | |
| WO | 2009047601 A2 | 4/2009 | |
| WO | 2014161718 A1 | 10/2014 | |
| WO | 2018153515 A1 | 8/2018 | |

OTHER PUBLICATIONS

International Preliminary Report on Patentability for PCT Application No. PCT/EP2017/079817, dated May 19, 2019, 4 pages.
International Search Report for PCT Application No. PCT/EP2017/079817, dated Jan. 17, 2018, 7 pages.
Office Action for German Application No. DE 10 2017 103 487.0, dated Feb. 18, 2022, 6 pages.
Office Action for German Application No. DE 10 2017 103 487.0, dated Nov. 27, 2017, 6 pages.

* cited by examiner

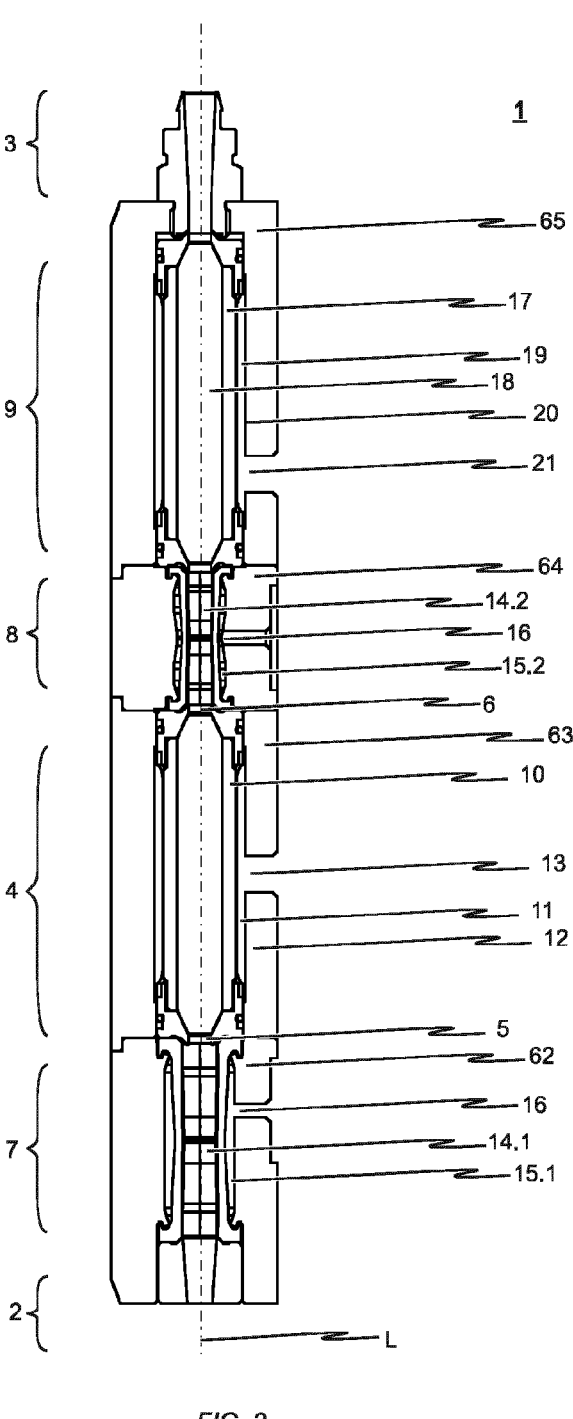
_FIG. 2_

DENSE PHASE POWDER PUMP

CROSS-REFERENCE TO RELATED APPLICATION(S)

This application is a continuation-in-part of U.S. application Ser. No. 16/487,326 filed Aug. 20, 2019 for "Dense Phase Powder Pump" by F. Mauchle and H. Vieli, which is a U.S. National Phase of PCT Application No. PCT/EP2017/079817, filed Nov. 20, 2017 for "Dense-Phase Powder Pump" by F. Mauchle and H. Vieli, which claims priority to Application No. DE 10 2017 103 487.0, filed Feb. 21, 2017.

BACKGROUND

The present invention relates to a dense phase powder pump for conveying coating powder. Specifically, the invention relates in particular to a dense phase powder pump for conveying coating powder from a first powder reservoir to a second powder reservoir arranged downstream of the dense phase powder pump or a powder spray gun or similar device arranged downstream of the dense phase powder pump for spraying coating powder.

Dense phase powder pumps of this type are known in principle from the prior art. For example, EP 1 551 558 A1 relates to a dense phase powder pump comprising a first powder conveying chamber and a second powder conveying chamber arranged parallel to the first powder conveying chamber. The two powder conveying chambers of this known prior art dense phase powder pump are each limited both on the intake side as well as the discharge side by a mechanically operated pinch valve arrangement.

SUMMARY

In one aspect, the present disclosure is directed toward a dense phase powder pump for conveying coating powder from a first powder reservoir to a downstream second powder reservoir or a downstream powder spray coating gun or similar device for spraying coating powder. The dense phase powder pump comprises at least one powder conveying chamber which is fluidly connected or connectable to the first powder reservoir via a powder inlet and to the second powder reservoir, or a powder spray coating gun or similar device for spraying coating powder respectively, via a powder outlet, wherein at least one powder inlet valve is provided at the powder inlet and at least one powder outlet valve at the powder outlet. This dense phase powder pump is characterized in that the at least one powder inlet valve and/or the at least one powder outlet valve exhibits an effective flow cross section in the respective open state which corresponds to at least 35% of the effective flow cross section of the at least one powder conveying chamber; and the dense phase powder pump is configured as a single-chamber dense phase powder pump and comprises only one single powder conveying chamber for conveying coating powder.

The present summary is provided only by way of example, and not limitation. Other aspects of the present disclosure will be appreciated in view of the entirety of the present disclosure, including the entire text, claims, and accompanying figures.

BRIEF DESCRIPTION OF THE DRAWINGS

FIG. 2 is a schematic longitudinal sectional representation along the powder path through a second exemplary embodiment of the inventive dense phase powder pump.

Figure 1:
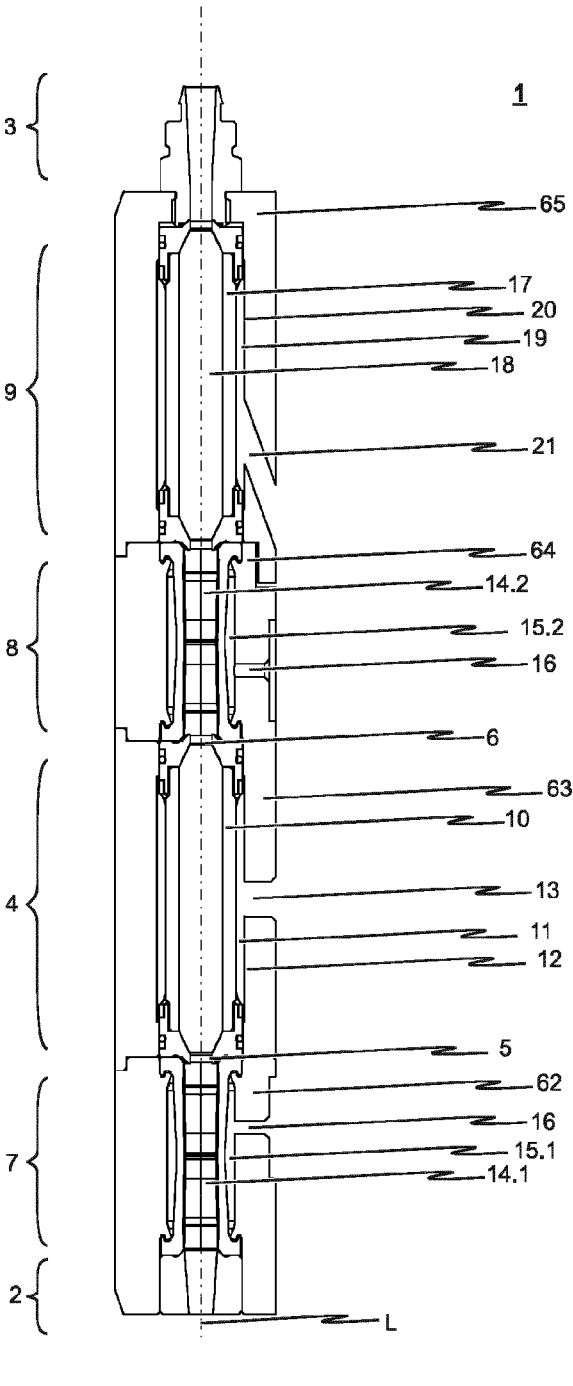
FIG. 1 is a schematic longitudinal sectional representation along the powder path through a first exemplary embodiment of the dense phase powder pump according to the present disclosure.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

In some dense phase powder pump systems, powder hoses connected to the respective powder conveying chambers of the dense phase powder pump are deformable at the intake side/discharge side region of the dense phase powder pump by a mechanically operated piston in order to squeeze or respectively open the hose section as needed. A filter tube is allocated to each powder conveying chamber of this known prior art dense phase powder pump, which limits the volume of the corresponding powder conveying chamber. The filter tube is permeable to air but not to coating powder, and is surrounded by an annular chamber to which negative pressure or compressed air can be alternatingly connected. Coating powder can thereby be selectively drawn into each powder conveying chamber or be discharged out of the respective powder conveying chamber by means of compressed air. The two parallel arranged powder conveying chambers operate in alternating phases, meaning that one of the two powder conveying chambers draws in coating powder through the powder inlet of the dense phase powder pump while the other of the two powder conveying chambers dispenses a portion of coating powder previously sucked into the powder conveying chamber through the powder outlet of the dense phase powder pump.

Dense phase powder pumps having multiple (two) powder conveying chambers connected in parallel to each other are also known from WO2005/005060A2 (US2006/0193704A1), DE19959473A1 (US2001/0003568A1) and EP1752399A1. Using dense phase powder pumps to convey coating powder to corresponding devices for spraying coating powder such as in particular powder spray coating gun is known from DE19611533B4, WO2004/087331A1 and EP1566352A2.

Before the use of dense phase powder pumps of the type specified above became known as a means for conveying coating powder, powder pumps configured as injectors were used to convey coating powder, and are still being used today. In contrast to dense phase powder pumps as described above, however, powder pumps configured as injectors have the disadvantage of normally only being able to convey a small volume of coating powder per unit of time. Dense phase powder pumps of the type described above have consequently prevailed in practice, in particular with respect to applications in which a relatively large volume of coating powder is to be conveyed per unit of time. In practical use, however, it has been shown that a dense phase powder pump, as known for example from EP1551558A1, exhibits problems with continuous powder feeding or respectively requires relatively frequent maintenance, particularly with certain types of powders. Accordingly, one task of the presently disclosed system is that of further developing a dense phase powder pump of the type cited at the outset such that it is less maintenance-prone during operation and in particular always provides continuous and consistent powder conveyance regardless of the type of powder. This task is inventively solved by the subject matter described hereinafter.

The disclosed system therefore particularly specifies a dense phase powder pump for conveying coating powder from a first powder reservoir to a downstream second powder reservoir or a downstream powder spray coating gun or similar device for spraying coating powder, wherein the dense phase powder pump comprises at least one powder conveying chamber which is fluidly connected or connectable to the first powder reservoir via a powder inlet and to the second powder reservoir, or powder spray coating gun or similar device for spraying coating powder respectively, via a powder outlet. At least one powder inlet valve is provided at the powder inlet and at least one powder outlet valve at the powder outlet of the dense phase powder pump. It is in particular inventively provided for the at least one powder inlet valve and/or the at least one powder outlet valve to exhibit an effective flow cross section when in the open state which corresponds to at least 35% of the effective flow cross section of the at least one powder conveying chamber. As used throughout the present application, including in the claims, the terms "flow cross section" and "effective flow cross section" are herein defined as referring to two-dimensional cross-sectional area. Specifically, the "effective flow cross sections" of the at least one powder conveying chamber and the powder inlet and outlet valves (in open states) refer to the cross-sectional area of the internal space through which flow is possible.

The solution according to the present disclosure is based on the surprising discovery that a particularly consistent, more continuous and in particular also lower-maintenance operation of the dense phase powder pump can be achieved when the at least one powder inlet valve and/or the at least one powder outlet valve in their respective open state exhibits an effective flow cross section which does not fall below a minimum value—in relation to the effective flow cross section of the at least one powder conveying chamber of the dense phase powder pump—of at least 35%.

In other words, the present disclosure proposes the (intentional) oversizing of the at least one powder inlet valve and/or the at least one powder outlet valve. In this context, "oversizing" means that the respective valve has a larger effective flow cross section in the open state than the flow cross section which would actually be necessary to completely fill the respective powder conveying chamber with the powder to be conveyed or respectively completely empty the respective powder conveying chamber within the given intake/discharge phase.

It was thus surprisingly found that (intentionally) oversizing at least one powder inlet/powder outlet valve can significantly reduce the risk of clumps forming during the intake/discharge process, and that in particular also with respect to powder types which tend to form clumps. Furthermore, there is a clearly higher response time with correspondingly oversized powder inlet/outlet valves— compared to conventionally utilized "normal-sized" valves—such that the switching cycle between powder intake phase and powder discharge phase can be even further increased, which again has a positive effect on consistent and continuous powder conveyance.

Provided in preferential embodiments of the inventive dense phase powder pump is for just the at least one powder inlet valve to be of correspondingly oversized configuration. This embodiment is based on the knowledge that the powder inlet valve of the dense phase powder pump is critically pivotal to regulating the flow of powder which the dense phase powder pump can actually convey per unit of time. Embodiments of the inventive dense phase powder pump inasmuch provide for the at least one powder inlet valve to exhibit a larger effective flow cross section in the open state than an effective flow cross section of the powder outlet valve in its open state. The effective flow cross section of the at least one open powder inlet valve is thereby preferably configured to be at least 50%, preferably at least 100%, and even more preferentially at least 250% larger than the effective flow cross section of the at least one open powder outlet valve.

Alternatively, embodiments of the inventive dense phase powder pump provide for the at least one powder inlet valve and the at least one powder outlet valve to exhibit an at least substantially identical effective flow cross section when in their respective open state. This embodiment has the advantage of being able to use identically constructed valves for the at least one powder inlet valve and the at least one powder outlet valve, which is associated with advantages in terms of maintenance and stocking of spare parts.

According to embodiments of the inventive dense phase powder pump, it can be configured as a single-chamber dense phase powder pump in which only one single powder conveying chamber is provided for conveying the coating powder. Able to thereby be achieved, particularly in conjunction with the at least one (intentionally) oversized powder inlet/powder outlet valve, is that a sufficiently continuous conveyance of coating powder is also possible for practical use with a single-chamber dense phase powder pump; i.e. a dense phase powder pump only having one single powder conveying chamber for conveying coating powder. Among other reasons, this is due to the switching cycles of the valves and thus the operating cycles of the single-chamber dense phase powder pump being able to be increased with powder inlet/powder outlet valves of oversized configuration, which has a significant influence on continuous and consistent powder conveyance.

Special attention is merited by the combination of the at least one oversized powder inlet/powder outlet valve and the dense phase powder pump configured as a single-chamber dense phase powder pump. This applies in particular to those embodiments in which especially the powder inlet valve of the dense phase powder pump configured as a single-chamber dense phase powder pump is of correspondingly oversized configuration. This further development can in particular also overcome the longstanding preconception among experts, of namely that at least two powder conveying chambers arranged in parallel and alternately operated must be used to continuously convey coating powder, because the at least one (intentionally) oversized powder inlet/powder outlet valve in the dense phase powder pump configured as a single-chamber dense phase powder pump enables the pumping frequency; i.e. the frequency at which coating powder can be drawn into the single powder conveying chamber and then discharged again, to be increased accordingly.

Compared to conventional dense phase powder pumps, which are configured as multi-chamber dense phase powder pumps and comprise multiple, in particular at least two, powder conveying chambers arranged in parallel and operated in phase opposition to each other, powder conveyance of comparable consistency without flow pulsations can be achieved with a dense phase powder pump configured as a single-chamber dense phase powder pump according to the present disclosure in the powder path downstream of the powder outlet of the dense phase powder pump, whereby on the other hand, however, the number of components to be actuated during operation of the dense phase powder pump is significantly reduced and the structural design of the dense phase powder pump considerably simplified.

This inventive embodiment thus provides a particularly easily realized and yet effective alternative to conventional dense phase powder pumps configured as multi-chamber dense phase powder pumps while simultaneously reducing the structural components and simultaneously simplifying the circuitry needed in operating the dense phase powder pump.

As set forth herein, the dense phase powder pump comprises a powder inlet connected or connectable to the (upstream disposed) first powder reservoir and a powder outlet connected or connectable to the (downstream disposed) second powder reservoir or to the (downstream disposed) powder spray coating gun or similar device for spraying coating powder respectively. The powder inlet of the dense phase powder pump can thereby be arranged at a first end region of the dense phase powder pump and the powder outlet of the dense phase powder pump at an opposite second end region of the dense phase powder pump, wherein the at least one powder conveying chamber of the dense phase powder pump is arranged between the powder inlet and the powder outlet of the dense phase powder pump.

In one advantageous realization of the present disclosure, the at least one powder conveying chamber of the inventive dense phase powder pump comprises a powder inlet with the at least one powder inlet valve at a first end region and a powder outlet with the at least one powder outlet valve at an oppositely disposed second end region. The powder inlet of the at least one powder conveying chamber is fluidly connected or connectable to the powder inlet of the dense phase powder pump via the at least one powder inlet valve. On the other side, the powder outlet of the at least one powder conveying chamber of the dense phase powder pump is fluidly connected or connectable to the powder outlet of the dense phase powder pump via the at least one powder outlet valve.

In accordance with another aspect of the present disclosure, the dense phase powder pump comprises a powder inlet connected or connectable to the first powder reservoir and a powder outlet connected or connectable to the second powder reservoir or to the powder spray coating gun or similar device for spraying coating powder respectively, wherein the at least one powder conveying chamber of the inventive dense phase powder pump comprises a powder channel at one end region which serves both as a powder inlet as well as powder outlet for the at least one powder conveying chamber. Of advantage according to this aspect of the present disclosure is for the powder channel of the at least one powder conveying chamber to be fluidly connected or connectable to the powder inlet of the dense phase powder pump via the at least one powder inlet valve of the dense phase powder pump, wherein the at least one powder conveying chamber is fluidly connected or connectable to the powder outlet of the dense phase powder pump via the at least one powder outlet valve of the powder channel.

According to one preferential realization, it is thereby provided for the dense phase powder pump to further comprise a manifold in order to fluidly connect the powder channel of the powder conveying chamber to the powder inlet valve on the one hand and to the powder outlet valve on the other hand. Using a Y-fitting as a manifold is possible here, as are other embodiments suited for this purpose.

A control device designed to alternatingly control the at least one powder inlet valve and/or the at least one powder outlet valve of the dense phase powder pump is further provided in preferential embodiments of the inventive solution. The control device is preferably further designed to alternatingly generate a positive pressure and a negative pressure in the at least one powder conveying chamber of the dense phase powder pump.

The at least one powder conveying chamber of the dense phase powder pump is preferably allocated a gas channel via which the respective powder conveying chamber is alternatingly connected to a vacuum line or vacuum source for drawing coating powder into the powder conveying chamber through the open powder inlet valve while the powder outlet valve is closed, or to a compressed air line or compressed air source for pneumatically expelling a portion of powder from within the powder conveying chamber through the open powder outlet valve while the powder inlet valve is closed. The control device is thereby designed to alternatingly switch the single powder conveying chamber between intake and discharge of powder.

In advantageous realizations of the inventive dense phase powder pump, the above-cited gas channel comprises an intake air opening and a compressed air opening in a peripheral wall of the powder conveying chamber housing, whereby a microporous filter element is preferably further provided, preferably in form of a filter tube, which forms the peripheral wall of the powder conveying chamber over at least part of the length or preferably the entire length of the powder conveying chamber and separates the powder chamber from an annular chamber. The annular chamber is formed between the outer circumference of the filter element preferably configured as a filter tube and the inner circumference of the peripheral housing wall and surrounds the filter element preferably configured as a filter tube. Due to its small pore size, the filter element preferably configured as a filter tube is permeable to air albeit not to coating powder. It is preferably made of a sintered material.

The at least one powder inlet valve and the at least one powder outlet valve of the inventive dense phase powder pump are preferably each configured as a pinch valve, particularly structured to comprise a flexible elastic hose as a valve channel, wherein actuating compressed air can squeeze said flexible elastic hose in a pressure chamber surrounding the hose in order to close the respective valve.

In particular of advantage in this context is for the at least one powder inlet valve configured as a pinch valve and the at least one powder outlet valve configured as a pinch valve to each have a pinch valve housing comprising a powder inlet and a powder outlet as well as an elastically deformable valve element, preferably in the form of a hose section. In particular, the valve element is to thereby be arranged inside the pinch valve housing such that the powder inlet of the pinch valve can be brought into fluid communication with the powder outlet of the pinch valve via the valve element configured as a hose section.

It is thereby advantageous for the pinch valve housing to comprise at least one connection for the feed of compressed air (actuating compressed air) as required into the space formed between the inner wall of the pinch valve housing and the valve element arranged inside the pinch valve housing. Excess pressure forms when actuating compressed air is fed into the space between the inner wall of the pinch valve housing and the valve element, in consequence of which the valve element is radially compressed and the pinch valve closed. When pressure is thereafter relieved in the pinch valve housing, the valve element returns to its initial state so that the valve element provides a fluid connection between the powder inlet of the pinch valve and the outlet of the pinch valve.

It is furthermore conceivable in this context for the pinch valve housing to comprise at least one connection for generating a negative pressure inside the pinch valve housing when needed in order to thereby reduce the amount of time the pinch valve is open.

The amount of powder able to be conveyed per unit of time by the inventive dense phase powder pump depends on several parameters, in particular the size (volume) of the powder conveying chamber, the frequency at which coating powder is drawn into the powder conveying chamber and then discharged again, the magnitude (amount) of the vacuum generated in order to draw the coating powder into the powder conveying chamber, the length of time the at least one powder inlet valve is open during the intake phase as well as the flow resistances in the powder lines upstream and in particular downstream the dense phase powder pump. The flow resistances in the powder lines upstream and in particular downstream of the dense phase powder pump are in particular dependent on the length and the internal cross section of the powder lines, usually powder hoses.

The conveying frequency of the dense phase powder pump primarily depends on the frequency at which coating powder is drawn into the powder conveying chamber and then discharged or able to be discharged again.

In order to prevent or at least reduce pulsations in the flow of powder discharged at the powder outlet of the dense phase powder pump in the inventive dense phase powder pump configured in particular as a single-chamber dense phase powder pump, the dense phase powder pump is structurally designed according to preferential realizations of the presently disclosed system such that the response time for switching from an intake phase, during which the powder conveying chamber of the single-chamber dense phase powder pump is connected to a vacuum source, to a discharge phase, during which the powder conveying chamber of the single-chamber dense phase powder pump is connected to a compressed air source or conveying compressed air source respectively, can be accordingly shortened so that the conveying frequency of the dense phase powder pump can ultimately be increased.

Thereby in particular inventively provided is for the at least one powder inlet valve and/or the at least one powder outlet valve to exhibit an effective flow cross section in the open state which corresponds to at least 35% of the effective flow cross section of the least one powder conveying chamber.

According to one aspect of the presently disclosed system, it is further provided in this respect for a negative pressure to be applied in the powder conveying chamber during the intake phase of the powder conveying chamber no earlier than simultaneously with, or preferably after a specific delay period subsequent to a control signal for opening the powder inlet valve arranged at the powder inlet of the powder conveying chamber such that the buildup of negative pressure in the powder conveying chamber starts, at the earliest, at the same time the powder inlet valve opens, but preferably after said predetermined delay time following the opening of the powder inlet valve. The predetermined delay time is preferably in a range of between 0 ms and 50 ms for an approximate 200 ms conveying cycle of the conveying chamber (=pump cycle of the dense phase powder pump). This example does not, however, exclude the use of other delay periods and cycle times for the dense phase powder pump.

What is achievable in advantageous realizations of the inventive solution by not generating a negative pressure in the powder conveying chamber during the intake phase of the dense phase powder pump until the powder inlet valve is already open or, respectively, no earlier than simultaneously with the powder inlet valve opening is the negative pressure in the powder conveying chamber less strongly counteracting an opening movement of the powder inlet valve, particularly when same is designed as a pinch valve, at least at the point in time at which the opening movement of the powder inlet valve starts, than is the case in the solutions known from the prior art and designed as multi-chamber dense phase powder pumps.

To shorten the response time of the inventive dense phase powder pump and thus increase the conveying frequency of same, it is preferably provided, additionally or alternatively to the above-cited measures, for both the powder inlet valve provided at the powder inlet of the powder conveying chamber as well as the powder outlet valve provided at the powder outlet of the powder conveying chamber to be designed as a pneumatically controllable pinch valve. Control of these pinch valves is realized by corresponding control valves which coordinate the supplying of actuating compressed air to said pinch valves.

Provided according to preferential embodiments of the inventive dense phase powder pump is shortening the length of the pneumatic control lines to the pinch valves as much as possible in order to achieve being able to minimize the response delay times upon actuation of the respective pinch valves; i.e. upon the supplying of actuating compressed air or respective applying of negative pressure or venting of the corresponding pinch valve housing.

To that end, preferential embodiments of the inventive dense phase powder pump for example provide for a material block preferably composed of a plurality of modules in which the at least one powder conveying chamber of the dense phase powder pump is formed, or on which the at least one powder conveying chamber of the dense phase powder pump is arranged respectively, whereby the powder inlet valve and the powder outlet valve of the at least one powder conveying chamber of the dense phase powder pump are likewise advantageously arranged on said material block. The corresponding control valves serving to pneumatically actuate the powder inlet and powder outlet valve, which are each preferably configured as a pinch valve, are thereby in particular fluidly connected directly to the powder inlet valve/powder outlet valve via compressed air ducts formed in the material block so as to ensure the supply and discharge of actuating air to the powder inlet/powder outlet valve configured as pinch valves.

In conjunction with the structure described above, it is further advantageous for all the control valves which are fluidly connected to the at least one powder conveying chamber of the inventive dense phase powder pump for supplying conveying compressed air (during the discharge phase of the dense phase powder pump) and vacuum (during the intake phase of the dense phase powder pump) to be arranged on the material block and fluidly connected directly to the single powder conveying chamber by means of channels formed in the material block.

These measures serve to shorten the length of the pneumatic control lines to the pinch valves and the length of the air lines to the at least one powder conveying chamber to the greatest extent possible in order to achieve being able to minimize the response delay periods upon actuation of the respective pinch valves; i.e. upon the supplying of actuating compressed air or respective applying of negative pressure or venting of the corresponding pinch valve housing.

As stated above, the response time of the inventive dense phase powder pump can be shortened, and thus the conveying frequency increased, by ensuring that when a negative pressure is generated in the powder conveying chamber during the intake phase of the dense phase powder pump, doing so starts no earlier than simultaneously with the opening of the powder inlet valve arranged on the powder inlet of the powder conveying chamber. Alternatively or additionally thereto, the pumping frequency can thereby be increased by shortening the channels provided to the pinch valves for the supplying/drawing off of actuating compressed air for pneumatically actuating the powder inlet valve configured as a pinch valve or the outlet valve configured as a pinch valve respectively to the greatest extent possible.

Additionally thereto, it is advantageous to shorten the path length of the channels or respectively the channel for supplying conveying compressed air to the at least one powder conveying chamber or respectively the path length of the channels or respectively the channel for creating a vacuum in the powder conveying chamber. Response lag time can thereby be reduced when the powder inlet valve or powder outlet valve is respectively activated and when a vacuum is generated in the at least one powder conveying chamber during the intake phase or, respectively, a positive pressure during the discharge phase.

As the conveying frequency of the dense phase powder pump is increased accordingly, sufficient homogeneity is ensured in the powder flow dispensed at the powder outlet of the dense phase powder pump.

To further increase the homogeneity of the powder flow at the powder outlet of the dense phase powder pump, and particularly to prevent disruptive pulsations from occurring in the powder flow downstream of the powder outlet of the dense phase powder pump, preferential realizations of the inventive solution make use of an additional compressed air inlet device additionally or alternatively to the previously cited measures. This additional compressed air inlet device leads to at least one point in the powder path between the powder outlet valve associated with the at least one powder conveying chamber and the powder outlet of the dense phase powder pump or preferably directly downstream the powder outlet of the dense phase powder pump and serves to supply additional compressed air serving as additional conveying compressed air as needed. In other words, additionally to the conveying compressed air introduced into the powder conveying chamber during the discharge phase of the dense phase powder pump, additional conveying compressed air is fed in directly ahead of or behind the powder outlet of the dense phase powder pump at appropriate times or upon appropriate events respectively by means of the additional compressed air inlet device.

In realizing the at least one additional compressed air inlet device, a filter tube is advantageously provided through which run at least sections of the powder path between the powder outlet valve and the powder outlet of the dense phase powder pump. Preferably, part of the length of the powder path downstream of the powder outlet valve of the dense phase powder pump is conducted through the filter tube. The filter tube is permeable to compressed air albeit not to the particles of the coating powder. It is thereby expedient for the filter tube to be formed from microporous material such as for example sintered material. The filter tube forms a peripheral wall around the powder path and thus a relatively large area through which even small volumes of additional compressed air can flow homogeneously through the filter tube into the powder path and influence the powder particles in the sense of homogenizing the powder concentration.

It is however of course also possible for the additional compressed air inlet device to be formed without a filter element, in particular a filter tube. The filter element/filter tube only serves to prevent powder particles from being able to infiltrate into an additional compressed air line connected to the additional compressed air inlet device.

In order to be able to particularly effectively reduce or prevent flow pulsations in the powder path downstream of the powder outlet of the dense phase powder pump, it is of advantage for the additional compressed air inlet device to pulsatively introduce additional compressed air into the powder path downstream of the powder outlet valve of the dense phase powder pump. The pulse frequency of the additional compressed air should thereby be at least equal to the powder conveying chamber frequency at which the powder conveying chamber dispenses portions of powder.

According to preferential realizations of the inventive dense phase powder pump, it is provided for the pulse frequency of the additional compressed air to be equal to the frequency of the powder conveying chamber; i.e. the frequency at which portions of powder are dispensed from the powder conveying chamber. In this context, it is expedient to provide a mechanism for pulsatively supplying additional compressed air to the at least one additional compressed air inlet device, wherein this mechanism for pulsatively supplying additional compressed air is advantageously configured such that additional compressed air is supplied to the at least one additional compressed air inlet device in phase opposition relative to the powder dispensing cycle of the powder conveying chamber. Doing so thus achieves the additional compressed air always being fed into the powder path past the powder outlet valve when the powder outlet valve is closed. This measure allows in particular the flow velocity in the powder line downstream of the powder outlet of the dense phase powder pump to be able to assume a non-fluctuating constant value.

The presently disclosed system is in particular also based on the realization that it is advantageous, particularly in the case of a dense phase powder pump configured as a single-chamber dense phase powder pump, for additional compressed air to be fed in at the powder outlet of the dense phase powder pump as additional conveying compressed air, whereby the powder/air mixture flows all the more homogeneously through the powder line downstream of the powder outlet of the dense phase powder pump when the volume of additional compressed air fed into the powder path downstream of the powder outlet valve during the intake phase of the powder conveying chamber is essentially equal to the volume of conveying compressed air serving to pneumatically discharge the portion of powder previously drawn into the powder conveying chamber as fed into the powder conveying chamber during the powder discharge phase.

In order to implement this realization in the inventive dense phase powder pump, it is on the one hand conceivable to provide a mechanism for pulsatively supplying additional compressed air to the at least one additional compressed air inlet device, wherein the mechanism adapts the volume of additional compressed air fed into the powder path to the volume of the conveying compressed air fed into the powder conveying chamber.

Yet a complex compressed air volume control system can be dispensed with when the pneumatic resistances which occur when feeding the conveying compressed air into the powder conveying chamber and when feeding the additional compressed air into the powder path are able to assume essentially the same value. In order to achieve this, it is of advantage for at least the essential components of the additional compressed air inlet device; i.e. the components needed to supply the additional compressed air into the powder path, to exhibit the same structure as the essential components of the powder conveying chamber; i.e. the powder conveying chamber components needed to supply the conveying compressed air during the discharge phase of the powder conveying chamber. Conceivable in this context, for example, is for the additional compressed air inlet device to comprise a chamber wall formed by a filter for at least part of its length which surrounds and separates the powder path from an intermediate chamber surrounding the filter and formed between the filter and a housing of the additional compressed air inlet device. At least the filter of the additional compressed air inlet device should thereby be structurally identical to the filter of the powder conveying chamber.

On the other hand, it is further conceivable for a control device to be provided by means of which the additional compressed air frequency preferably automatically adjustable as a function of the powder dispensing frequency of the powder conveying chamber can preferably be automatically controlled or regulated. What is in particular ensured by the pulse frequency of the additional compressed air being adapted to the powder conveying chamber frequency, whereby the additional compressed air is then advantageously always fed into the powder path past the powder outlet valve of the dense phase powder pump when the dense phase powder pump is in its intake phase in which the powder inlet valve is open and the powder outlet valve closed, is always utilizing a sufficient volume of conveying compressed air as needed to transport the coating powder.

It is however of course also conceivable for additional compressed air to be additionally introduced into the powder path via the additional compressed air inlet device after the powder outlet valve of the dense phase powder pump during the discharge phase of the dense phase powder pump.

Only feeding additional compressed air into the powder path by means of the additional compressed air inlet device when the dense phase powder pump is in its intake phase can, however, reduces the resources (compressed air and thus energy) for operating the dense phase powder pump. Thereby in particular also prevented is having too much conveying compressed air in the powder path downstream the powder outlet of the dense phase powder pump which then prevents loads disposed downstream of the dense phase powder pump (powder spray coating guns or similar devices for spraying coating powder) from expelling powder particles out of the spraying jet.

It is in particular advantageous in this context when the volume of additional compressed air flowing through the additional compressed air inlet device per unit of time, which is introduced into the powder path past the powder outlet valve of the dense phase powder pump, can be adjusted, preferably automatically controlled or regulated, by means of a control device as a function of the amount of powder conveyed per unit of time.

The present disclosure is not only directed toward a dense phase powder pump comprising at least one powder inlet valve at its powder inlet and at least one powder outlet valve at its powder outlet, whereby the at least one powder inlet valve and/or the at least one powder outlet valve in the open state exhibits an effective flow cross section corresponding to at least 35% of the effective flow cross section of the at least one powder conveying chamber, but rather also to a powder spray coating device for spray coating objects with coating powder, wherein the powder spray coating device comprises a dense phase powder pump of the above-described type as well as at least one preferably automatic and manually configured spray coating gun. The spray coating gun has a coating powder inlet which is connected or connectable to the powder outlet of the dense phase powder pump by a powder line.

Inventively provided with respect to a method for conveying coating powder from a first powder reservoir to a second powder reservoir disposed downstream of the first powder reservoir or to a powder spray coating gun or similar mechanism for spraying coating powder disposed downstream of the first powder reservoir, is for the method to comprise the method step of providing a powder spray coating device of the above-cited type, which thus comprises the inventive dense phase powder pump as well as at least one spray coating gun, and the method step of performing a specific operating cycle, wherein said specific operating cycle comprises the following cycle steps:

a) generating a negative pressure in the at least one powder conveying chamber of the dense phase powder pump to draw coating powder into the powder conveying chamber through an open powder inlet valve of the dense phase powder pump while the powder outlet valve of the dense phase powder pump is closed;

b) closing the powder inlet valve and opening the powder outlet valve;

c) introducing compressed gas into the powder conveying chamber to dispense the coating powder from the powder conveying chamber through the open powder outlet valve while the powder inlet valve is closed; and d) closing the powder outlet valve and opening the powder inlet valve.

One aspect of the inventive method provides for additional compressed air to be fed in at least at one point in the powder path downstream of the powder outlet valve as additional conveying compressed air during cycle step a) or when transitioning from cycle step d) to cycle step a). According to this aspect, the additional compressed air is preferably fed into the powder path in the manner as previously described in conjunction with the dense phase powder pump.

Figure 3:
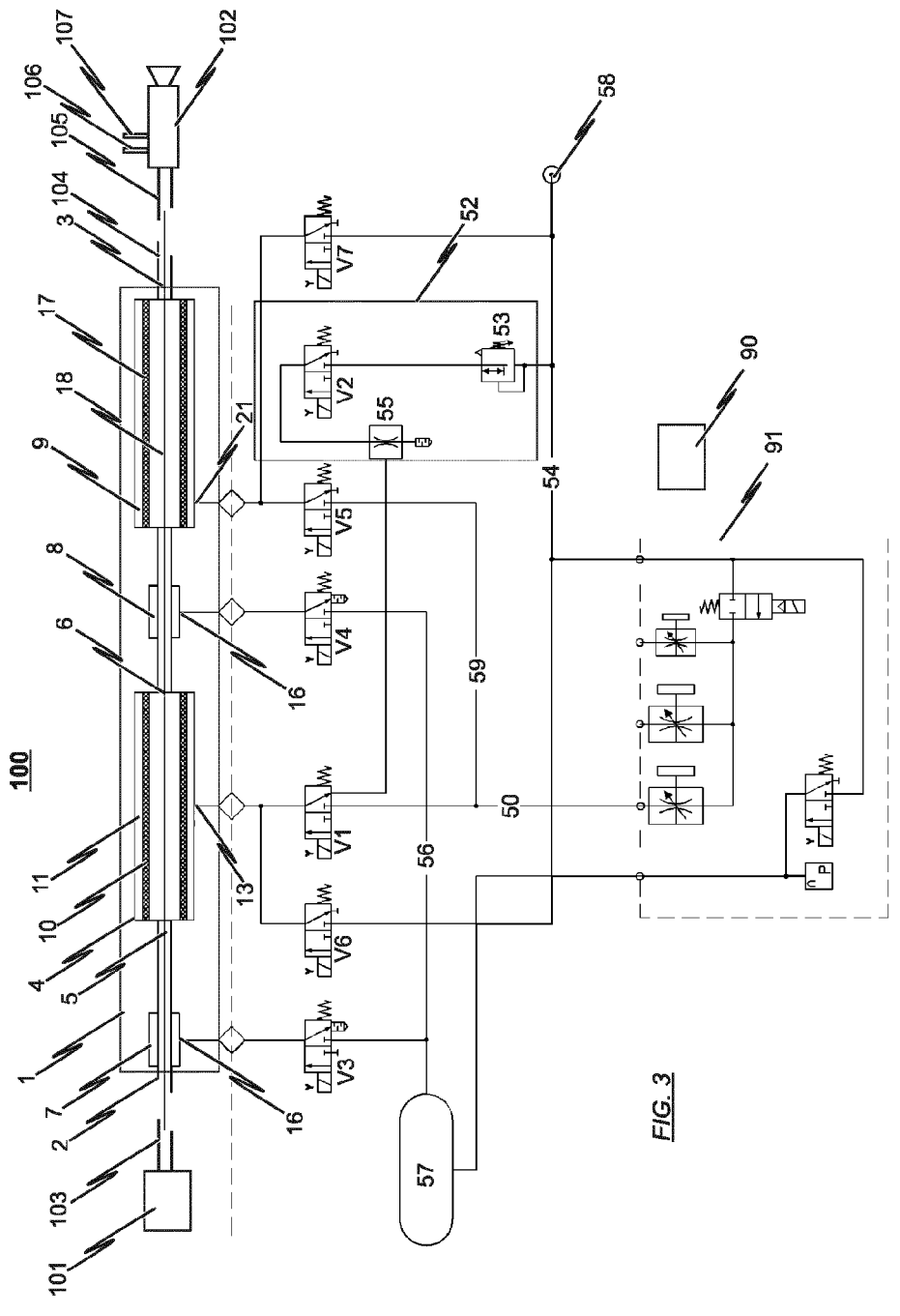
FIG. 3 is a schematic representation of an exemplary embodiment of a powder spray coating device which makes use of a dense phase powder pump according to the present disclosure.

FIG. 3 schematically depicts a powder spray coating device 100 which makes use of an embodiment of the inventive dense phase powder pump 1 for conveying coating powder from a first powder reservoir 101 to a powder spray coating gun 102 disposed downstream of the dense phase powder pump 1. Another mechanism for spray coating powder onto an object to be coated or a second powder reservoir can also be used in place of the powder spray coating gun 102.

As depicted in FIG. 3, the exemplary embodiment of the inventive dense phase powder pump 1 used therein comprises a powder inlet 2 which is fluidly connected or connectable to a first powder reservoir 101 by means of a powder line 103, in particular by means of a suction tube or the like. A powder outlet 3 is provided at the oppositely disposed end region of the dense phase powder pump 1 which is connected or connectable to a coating powder inlet 105 of the powder spray coating gun 102 by means of a powder line 104, in particular by means of a powder hose.

Specifically, and as can particularly be noted from the FIG. 1 and FIG. 2 representations, particularly the powder outlet 3 of the dense phase powder pump 1 in the first and second exemplary embodiment of the inventive dense phase powder pump 1 is configured as a hose connector to which the appropriate powder line 104 can be attached and secured with a hose clip. Although not shown in FIG. 1 and FIG. 2, it is conceivable for the powder inlet 2 of the dense phase powder pump 1 to also be configured as a hose connector to which the appropriate powder line 103 can be attached and secured with a hose clip. However, other embodiments are of course also conceivable for the powder inlet 2/powder outlet 3.

The dense phase powder pumps 1 depicted as an example in the drawings are each configured as single-chamber dense phase powder pumps, wherein only one single powder conveying chamber 4 is provided to convey coating powder from the first powder reservoir 101 to the powder spray coating gun 102, or to another device for spray coating objects or another powder reservoir respectively.

The present disclosure is not, however, limited to such embodiments of the dense phase powder pump 1; the inventive solution is in fact also applicable to dense phase powder pumps 1 configured as multi-chamber dense phase powder pumps. For simplification purposes, however, the following will describe the features relevant to the present invention in greater detail in the context of dense phase powder pumps 1 configured as single-chamber dense phase powder pumps. The following remarks are accordingly analogously applicable to multi-chamber dense phase powder pumps.

In the exemplary embodiments of the dense phase powder pump 1 according to FIG. 1 and FIG. 2, the powder conveying chamber 4 comprises a powder inlet 5 at a first end region which points toward the powder inlet 2 of the dense phase powder pump 1. The powder conveying chamber 4 further comprises a powder outlet 6 pointing toward the powder outlet 3 of the dense phase powder pump 1. A powder inlet valve 7 is arranged directly adjacent the powder inlet 4 of the powder conveying chamber 4, and namely in such a manner that said powder inlet valve 7 lies between the powder inlet 5 of the powder conveying chamber 4 and the powder inlet 2 of the dense phase powder pump 1. In the same way, a powder outlet valve 8 is arranged directly adjacent the powder outlet 6 of the powder conveying chamber 4.

In contrast to the powder inlet region of the dense phase powder pump 1, however, the powder outlet valve 8 at the powder outlet region of the dense phase powder pump 1 is not arranged directly between the powder outlet 6 of the powder conveying chamber and the powder outlet 3 of the dense phase powder pump 1; rather an additional compressed air inlet device 9 is arranged between the powder outlet valve 8 and the powder outlet 3 of the dense phase powder pump 1.

As will be described in greater detail below, this additional compressed air inlet device 9 serves to feed additional conveying compressed air into the powder path between the powder outlet valve 8 and the powder outlet 3 of the dense phase powder pump 1 when needed.

To be noted at this point is that it is not mandatory for the additional compressed air inlet device 9 to be arranged between the powder outlet valve 8 and the powder outlet 3 of the dense phase powder pump 1. The effects able to be achieved with the additional compressed air inlet device 9, to be described in greater detail below, can also be realized when the additional compressed air inlet device 9 is disposed after the powder outlet 3 of the dense phase powder pump 1.

Although not depicted in the drawings, a further valve, in particularly pinch valve, is provided between the additional compressed air inlet device 9 and the powder outlet 3 of the dense phase powder pump 1 in advantageous realizations of the inventive dense phase powder pump 1, same then assuming the function of the powder outlet valve due to being arranged directly at the powder outlet 3 of the dense phase powder pump 1.

As is particularly apparent from the FIG. 1 and FIG. 2 representation, the powder inlet 2 of the dense phase powder pump 1, the powder inlet valve 7, the powder inlet 5 of the powder conveying chamber 4, the powder conveying chamber 4, the powder outlet 6 of the powder conveying chamber 4, the powder outlet valve 8, the additional compressed air inlet device 9 as well as the powder outlet 3 of the dense phase powder pump 1 all lie along a common longitudinal axis L in these exemplary embodiments. In other words, the powder inlet 2 of the dense phase powder pump 1 is provided at the opposite end from the powder outlet 3 of the dense phase powder pump 1 in these embodiments.

The structure and functioning particularly of the powder conveying chamber 4 of the exemplary embodiment of the dense phase powder pump 1 depicted in the drawings will be described in greater detail in the following.

As can be seen from the longitudinal sectional representations in FIG. 1 and FIG. 2 or the schematic representation in FIG. 3, between its powder inlet 5 and its powder outlet 6, the powder conveying chamber 4 is formed by the cylindrical wall of a tube-like filter 10 which is permeable to air albeit not to coating powder and can consist for example of sintered material. The filter 10 configured as a filter tube is surrounded by an intermediate chamber 11, the exterior of which is limited by a housing 12 of the powder conveying chamber 4.

An air exchange opening 13 which is fluidly connected to a control valve V1 (see FIG. 3) opens into the housing 12. The powder conveying chamber 4 can be alternatingly supplied with conveying compressed air from a conveying air supply line 50 or acted upon by a vacuum/negative pressure of a vacuum source 52 via control valve V1.

In the embodiment of the inventive powder spray coating device 100 depicted schematically in FIG. 3, the vacuum source 52 exhibits an injector 55 able to supply pressurized injector air as needed from a compressed air supply line 54 or a compressed air source 58 respectively, for example by means of a pressure regulator 53 and a further control valve V2.

In order to be able to draw coating powder from the first powder reservoir 101 into the powder conveying chamber 4 via the powder inlet 2 of the dense phase powder pump 1 during an intake phase of the dense phase powder pump 1, the powder outlet valve 8 arranged at the powder outlet 6 of the powder conveying chamber 4 is closed and the powder inlet valve 7 arranged between the powder inlet 2 of the of the dense phase powder pump 1 and the powder inlet 5 of the powder conveying chamber 4 opened. Simultaneously with the actuating of the powder outlet valve 8 and the powder inlet valve 7, or directly thereafter, the powder conveying chamber 4 is connected to the vacuum source 52 via control valve V1 and associated air exchange opening 13 so that the powder conveying chamber 4 is negatively pressurized and coating powder can be drawn in from the first powder reservoir 101.

After coating powder has been drawn into the powder conveying chamber 4, a change ensues from the intake phase to the discharge phase of coating powder from the conveying chamber 4. The powder inlet valve 7 is to that end closed and the powder outlet valve 8 opened while the control valve V1 establishes a fluid connection between the air exchange opening 13 and the compressed air supply line 50 so that the portions of coating powder previously drawn into the powder conveying chamber 4 during the intake phase are expelled through the open powder outlet valve 8 by means of the conveying compressed air supplied via the air exchange opening 13.

The operating phase of suctioning coating powder through the powder inlet 2 of the dense phase powder pump 1 and open powder inlet valve 7 then repeats again. This change of operating phases is continuously repeated.

The term "pump cycle" used herein refers to one cycle consisting of an intake phase and a discharge phase.

The valves (powder inlet valve 7, powder outlet valve 8) arranged at the inlet and the outlet side of the powder conveying chamber 4 are preferably each configured as pinch valves, whereby, however, other types of valves are in principle also possible.

The powder inlet/powder outlet valves 7, 8 respectively configured as a pinch valve in the exemplary embodiment depicted in the drawings each comprise a flexible elastic hose 14.1, 14.2 serving as a valve channel. To close the respective valve (powder inlet valve 7, powder outlet valve 8), the flexible elastic hose 14.1, 14.2 can be squeezed by means of actuating compressed air in a pressure chamber 15.1, 15.2 surrounding the flexible elastic hose 14.1, 14.2.

To that end, a respective air exchange opening 16 connected to a corresponding control valve V3, V4 is provided in each pressure chamber 15.1, 15.2. The control valves V3, V4 serve to alternatingly subject the pressure chambers 15.1, 15.2 of the powder inlet/powder outlet valves 7, 8 respectively configured as pinch valves to positive pressure from a compressed air supply line 56.

As depicted in FIG. 3, it is conceivable for the compressed air supply line 56 to be fluidly connected or connectable to a pressure reservoir 57, wherein the pressure reservoir 57 for its part is fluidly connected or connectable to a compressed air source 58. It is, however, of course also conceivable for the compressed air supply line 56 to be fluidly connected or connectable directly to the compressed air 58 (i.e. without the interposition of a pressure reservoir 57).

The flexible elastic hose 14.1, 14.2 of the powder inlet valve 7/powder outlet valve 8 configured as a pinch valve preferably has such an elasticity or residual stress that it automatically expands again after the pressure of the actuating compressed air ceases in the pressure chamber 15.1, 15.2 and the corresponding valve channel thus opens. In order to support the opening of the pinch valves and thus increase the switching frequency able to be realized with the dense phase powder pump 1, it is conceivable for negative pressure to be applied via the corresponding air exchange openings 16.

Particularly provided in the inventive solution is for the powder inlet valve 7 and/or powder outlet valve 8 to exhibit an effective flow cross section in the respectively open state which corresponds to at least 35% of the effective flow cross section of the powder conveying chamber 4. In other words, the powder inlet valve 7 and/or the powder outlet valve 8 is/are of intentionally oversized configuration in the inventive dense phase powder pump 1 so that the respective valve 7, 8 has a larger effective flow cross section in the open state than would actually be necessary to completely fill the respective powder conveying chamber 4 with the powder to be conveyed or respectively completely empty the powder conveying chamber 4 within the given intake/discharge phase.

By so doing, the risk of clumps forming during the intake/discharge process can be significantly reduced, and that in particular also with respect to powder types which have a tendency to form clumps. Moreover, the response time of valves 7, 8 is clearly increased such that the switching cycle between a powder intake phase and a powder discharge phase can be even further increased, which in turn has a positive effect on a consistent and continuous powder conveyance.

In the exemplary embodiment of the inventive dense phase powder pump 1 shown in FIG. 1, both the powder inlet valve 7 and the powder outlet valve 8 are at least of substantially the same dimensions or even of identical structure. In each case, both valves 7, 8 in this exemplary embodiment of the inventive dense phase powder pump 1 are of such an oversized configuration as to have an effective flow cross section in their respective open state which corresponds to at least 35% of the effective flow cross section of the powder conveying chamber 4.

Provided in particular in the exemplary embodiment of the inventive dense phase powder pump 1 shown in FIG. 1 is for the powder inlet valve 7 and the powder outlet valve 8 to exhibit substantially the same effective cross section in their respective open state. This embodiment has the advantage of being able to use identically constructed valves for the powder inlet valve 7 and the powder outlet valve 8, which is associated with advantages in terms of maintenance and stocking of spare parts.

In contrast, the exemplary embodiment of the inventive dense phase powder pump 1 shown in FIG. 2 only provides for the powder inlet valve 7 to be of accordingly oversized configuration while the powder outlet valve 8 is of correspondingly smaller configuration. This embodiment is based on the knowledge that the powder inlet valve 7 of the dense phase powder pump 1 is critically pivotal to regulating the flow of powder which the dense phase powder pump 1 can actually convey per unit of time.

Thus, the exemplary embodiment of the inventive dense phase powder pump 1 shown in FIG. 2 provides for the powder inlet valve 7 to exhibit a larger effective flow cross section in the open state than an effective flow cross section of the powder outlet valve in its open state. The effective flow cross section of the opened powder inlet valve 7 is thereby preferably configured to be at least 50%, preferably at least 100% and even more preferentially at least 250% larger than the effective flow cross section of the opened powder outlet valve 8.

Because of the larger geometry to powder inlet valve 7 and/or powder outlet valve 8, powder experiences less resistance and stress during the suction process and clogging is thereby prevented.

Although the compressive pressure to be applied to close valve 7, 8 is higher for a larger pinch valve hose 14.1, 14.2, the opening and closing times are in return all the more faster, which benefits the consistency of the powder feed rate. A clearly increased lifespan of the pinch valve hoses 14.1, 14.2 is also seen.

In the embodiment of the inventive dense phase powder pump 1 shown in FIG. 2, the pinch valve hose 14.2 of the powder outlet valve 8 keeps its typical known prior art dimensioning. Thus, two different sizes are used for the powder inlet valve 7 and the powder outlet valve 8 in the embodiment of the inventive dense phase powder pump 1 shown in FIG. 2, which also precludes mixing them up.

In the exemplary embodiments of the inventive dense phase powder pump 1 depicted in the drawings, the inventive solution provides for various measures in order to achieve a homogeneous flow of powder without disruptive pulsations downstream of the powder outlet 3 of the dense phase powder pump 1.

For example, the dense phase powder pump 1 is structurally configured such that the pumping frequency achievable with the dense phase powder pump 1 can be increased compared to the pumping frequency achievable with conventional multi-chamber dense phase powder pumps. To that end, the inventive solution makes use of a material block (not explicitly depicted) in advantageous realizations of the inventive dense phase powder pump 1 to which the powder inlet valve 7 needed for conveying coating powder as well as the powder outlet valve 8 likewise needed for conveying coating powder along with the control valves V3, V4 needed to actuate said valves 7, 8 (not explicitly depicted in the drawings) can be secured. Both the powder inlet valve 7 as well as the powder outlet valve 8 and the control valves V3, V4 needed to actuate same are preferably connected to channels formed in the material block (not depicted in the figures). The same also applies to control valve V1, which is fluidly connected to the air exchange opening 13 of the powder conveying chamber 4 via at least one channel formed in the material block.

Because in exemplary embodiments of the inventive dense phase powder pump 1, the respective control valves V1, V3 and V4 as well as the powder inlet and powder outlet valve 7, 8 are arranged as close as possible to the components of the dense phase powder pump 1 to be switched, this prevents high volumes in the respective pressure lines to the pneumatically actuated valves 7, 8 or the respective pressure line to the air exchange opening 13 of the powder conveying chamber 4 which would need to be alternatingly evacuated or filled with compressed air in the alternating operation of the dense phase powder pump 1. This can thereby prevent excessive response delay times, which ultimately also limit the frequency at which the dense phase powder pump 1 is able to convey coating powder.

As can particularly be seen from the depictions provided in FIG. 1 and FIG. 2, the dense phase powder pump 1 advantageously exhibits a modular structure in which the "powder inlet 2 of the dense phase powder pump 1," the "powder inlet valve 7," the "powder conveying chamber 4," the "powder outlet valve 8" and the "additional compressed air inlet device 9" together with the "powder outlet 2 of the dense phase powder pump 1" components are each configured as a modular component. The module which forms the powder inlet 2 of the dense phase powder pump 1 is not explicitly depicted in the drawings while the module 62 arranged downstream thereof constitutes the powder inlet valve 7. Modules 63 and 64 form the powder conveying chamber 4 and the powder outlet valve 8, while module 65 forms the combination of additional compressed air inlet device 9 and powder outlet 3 of the dense phase powder pump 1. The individual modules 62, 63, 64 and 65 are aligned axially with respect to the common longitudinal axis L and assembled one after the other on the material block.

The modular structure of the dense phase powder pump 1 considerably simplifies maintenance of the pump since the individual modules 62, 63, 64 and 65 of the pump can be particularly easily and particularly quickly replaced by the correspondent components when needed, for example upon a malfunction or for the purpose of servicing and/or cleaning.

Since a total of only two powder valves preferably configured as pinch valves (powder inlet valve 7 and powder outlet valve 8) are used in the exemplary embodiments of the inventive dense phase powder pump 1 depicted in the drawings, the pump's susceptibility to failure is significantly reduced compared to multi-chamber dense phase powder pumps which need to use at least four powder valves and a correspondingly greater number of control valves to control said powder valves. The number of parts subject to wear is in particular reduced to a minimum in the inventive dense phase powder pump 1 such that far more infrequent adjustments need to be made to the dense phase powder pump 1 settings due to wearing parts and a high reproducibility of the pump settings is ensured.

Moreover, the single-chamber design used in the exemplary embodiments of the inventive phase powder pump 1 depicted in the drawings enables a particularly compact pump structure. Powder conveyance of up to 400 g of coating powder per minute can thus for example be realized with a dense phase powder pump 1 approximately 250 mm in length (pump width: 40 mm).

The aforementioned additional compressed air inlet device 9 is however in particular provided in the exemplary embodiments of the inventive dense phase powder pump 1 depicted in the drawings in order to reduce or respectively prevent pulsations downstream of the powder outlet 3 of the dense phase powder pump 1, same provided at the outlet of the powder outlet valve 8 or respectively at the powder outlet 3 of the dense phase powder pump 1 in order to be able to feed additional conveying compressed air into the powder path when needed.

The realizations of the additional compressed air inlet device 9 employed in the exemplary embodiments of the inventive dense phase powder pump 1 depicted in the drawings exhibit a filter tube 17 which has a circumference of at least 180° (in the depicted embodiments, a circumference of 360°) and forms an interior channel wall surface over at least part of the length of the corresponding powder path to at least 180° of the powder path circumference (in the embodiments depicted in the drawings, an interior channel wall surface of 360°).

In other words, in the depicted embodiments of the inventive dense phase powder pump 1, the additional compressed air inlet device 9 comprises a filter tube 17 which surrounds the corresponding powder path by 360° over at least part of its length so that the portion of powder expelled from the conveying chamber 4 of the dense phase powder pump 1 during a powder discharge phase can flow homogeneously through the filter tube channel 18 formed by the filter tube 17.

A compressed air chamber 19 configured in the embodiment depicted in the drawings as an annular compressed air chamber surrounds the filter tube 17 at its outer circumference. The compressed air chamber 19 configured here as an annular compressed air chamber is surrounded by the filter tube 17 at its radially inner circumference and by a housing 20 at a distance from the filter tube 17 at its radially outer circumference. An air exchange opening 21 is set into the housing 20 via which compressed air can flow as needed into the compressed air chamber 19 from a compressed air line 59 by means of control valve V5 and from there into the filter tube channel 18 through filter tube 17.

Depending on the volume of additional conveying compressed air to be fed into the powder path per unit of time, the compressed air chamber 19 and the filter tube channel 18 formed by the filter tube 17 are to be of correspondingly large-volume configuration.

As stated above, the filter tube 17 of the additional compressed air inlet device 9 consists of microporous material so as to be permeable to air but not to coating powder. The filter tube 17 preferably consists of a sintered body, for example of metal or plastic, or a material mixture containing metal or plastic. It may further-more consist of a different material and/or be formed by a filter membrane.

The filter pores of the filter tube 17 are thereby preferably formed such that compressed air is led over both a circumferentially as well as longitudinally large powder path area in the powder path. These micropores of the powder tube 17 can be inclined radially or axially to the powder path and/or open into the filter tube channel 18 from the filter tube 17 tangentially to the powder path circumference and direct the compressed air accordingly. The large inner circumferential surface of the filter tube 17 enables homogenizing the axial powder distribution in the filter tube channel 18 and thus also in the powder path downstream of the powder outlet 3 of the dense phase powder pump 1 with a small volume of compressed air. Powder flow pulsations in the powder path can thus be prevented or at least reduced. Furthermore able to be achieved is a homogenizing of the powder density in the longitudinal direction and over the cross-sectional area of the powder path.

The volume of conveying compressed air fed into the powder path per unit of time can be kept low enough as to have no or only minor influence on the flow rate of the coating powder in the flow path. There is additionally the possibility of increasing the flow volume by increasing the pressure of the conveying compressed air additionally supplied by means of the additional compressed air inlet device 9 in order to influence the flow rate of the coating powder.

The compressed air additionally fed into the powder path of the dense phase powder pump 1 as needed by the additional compressed air inlet device 9 can flow into the filter tube channel 18 from the filter tube 17 in the form of jets or in the form of small bubbles, depending here on the type of filter pores and air pressure.

The filter tube 17 of the additional compressed air inlet device 9 should extend around the powder path over at least 180° of the powder path circumference, preferably over the full 360° of the powder path 360° circumference.

The filter tube 17 of the additional compressed air inlet device 9 is preferably a rigid body. It could, however, also be a flexible body.

According to one preferential embodiment of the present disclosure, the additional compressed air of the additional compressed air inlet device 9 is pulsatively supplied at a pulse frequency which is preferably equal to or if necessary greater than the frequency of the powder conveying chamber 4 at which said powder conveying chamber 4 dispenses portions of powder. A pulsating compressed air source or a compressed air pulser can be provided for the additional compressed air inlet device 9 to that end.

According to a further advantageous embodiment of the present disclosure, a control device 90 is provided which is configured such that the pulse frequency of the additional compressed air supplied to the additional compressed air inlet device 9 as a function of the powder dispensing frequency of the powder conveying chamber 4 is adjustable in at least one of the following ways: e.g. manually adjustable and/or preferably automatically controllable or preferably regulatable. The additional compressed air pulse frequency can thereby be advantageously increased with increasing powder dispensing frequency and reduced with decreasing powder dispensing frequency.

According to a further preferential embodiment of the present disclosure, the control device 90 can be advantageously configured such that the additional volume of compressed air flowing by its means through the additional compressed air inlet device 9 per unit of time as a function of the conveyed powder volume is adjustable in at least one of the following ways: e.g. manually adjustable and/or preferably automatically controllable or preferably regulatable.

The control device 90 of the powder spray coating device 100 can be designed for the cited setting of the additional compressed air pulse frequency or for the cited setting of the additional compressed air volume or for both settings. The control device 90 can incorporate all of the control elements or two or more control devices can be provided. If a manual setting of the additional compressed air pulse frequency or the additional compressed air flow volume is desired, a manual setting element can in each case be provided for the purpose.

As already indicated, the powder inlet valve 7 and the powder outlet valve 8 of the inventive dense phase powder pump 1 are each preferably configured as a pinch valve since less coating powder can deposit in pinch valves than in other types of valves and because powder deposits can be readily purged by the air flowing within them. Pinch valves are valves controllable by means of compressed air or by means of negative pressure. In principle, however, other controllable valves can also be used. Instead of controllable valves, there is also the further possibility of using self-acting valves, for example ball valves or flap valves, which are controlled by the pressure difference between the valve inlet side and the valve outlet side and thus automatically by the positive and negative pressure prevailing in the powder conveying chamber 4.

The previously noted control device 90 as schematically indicated in FIG. 3 is used to control the operation of the dense phase powder pump 1. The control device 90 is designed to suitably control the individual controllable components of the dense phase powder pump 1, particular control valves V1, V2, V3, V4 and V5, and coordinate their actuation.

A further control valve V6 is provided in the embodiment of the inventive powder spray coating device 100 schematically depicted in FIG. 3, by means of which the powder conveying chamber 4 can be subjected to high pressure during a cleaning cycle of the dense phase powder pump 1.

The control device 90 is preferably designed so as to open control valve V4 in preparation for the intake phase of the powder conveying chamber 4 such that the compressed air provided in the pressure reservoir 57 or by the compressed air source 58 respectively is directed into the pressure chamber 15.2 of the powder outlet valve 8 configured as a pinch valve via the compressed air supply line 56 and the air exchange opening 16. As a result, the flexible elastic hose 14.2 of the powder outlet valve 8 configured as a pinch valve is squeezed and the powder path through the powder outlet valve 8 provided by the flexible elastic hose 14.2 consequently closed.

With the closing of the powder outlet valve 8, the air exchange opening 13 provided in the housing 12 of the powder conveying chamber 4 is fluidly connected to the vacuum source 52 by means of the control device 90 in order to generate a negative pressure within the powder conveying chamber 4 so that coating powder can be drawn into the powder conveying chamber 4 via the powder inlet 2 of the dense phase powder pump 1 and the (opened) powder inlet valve 7 as well as powder inlet 5 of the powder conveying chamber 4.

In order to initiate the intake phase of the dense phase powder pump 1 according to preferential embodiments of the present disclosure, the control device 90 produces a control signal to generate the negative pressure in the powder conveying chamber 4 at the earliest at the same time as a control signal to open the powder inlet valve, or preferably after a predetermined delay time, so that the negative pressure begins to build up in the powder conveying chamber 4 no earlier than simultaneously with the opening of the powder inlet valve 7, preferably at the cited predetermined delay time after the opening of the powder inlet valve 7. With an approximate 200 ms conveying cycle for the powder conveying chamber 4, the predetermined delay time is for example in the range of between 0 ms and 50 ms.

Thereby achieved is the negative pressure in the powder conveying chamber 4 less strongly counteracting an opening movement of the powder inlet valve 7, particularly when same is a pinch valve, at least at the point in time at which the opening movement of the powder inlet valve 7 starts, than is the case in the prior art where there is usually already a drop in pressure in the respective powder conveying chamber prior to the opening of the powder inlet valve.

The control valve V3 is subsequently fluidly connected to the compressed air supply line 56, in consequence of which the pressure chamber 15.1 of the powder inlet valve 7 configured as a pinch valve is subject to a positive pressure which effects a squeezing of the flexible elastic hose 14.1 of the powder inlet valve 7 configured as a pinch valve. The powder inlet valve 7 is in this way closed. The control valve V4 depressurizes the air exchange opening 16 of the pressure chamber 15.2 of the powder outlet valve 8 configured as a pinch valve or evacuates the pressure chamber 15.2 respectively. Due to the elasticity of the hose 14.2 of the powder outlet valve 8 configured as a pinch valve, same then switches directly into its open state.

At this moment or immediately thereafter, control valve V1 is switched by the control device 90 such that the air exchange opening 13 formed in the housing 12 of the powder conveying chamber 4 is fluidly connected to the compressed air source 58. Compressed air then flows into the powder conveying chamber 4 via the compressed air supply line 50, control valve V1, the intermediate chamber 11 and the filter element 10 and expels the previously drawn-in portion of powder out of the powder outlet 6 of the powder conveying chamber 4.

By means of the conveying compressed air fed into the powder conveying chamber 4 via the compressed air supply line 50, the portion of powder is further transported through the opened powder outlet valve 8, the filter tube channel 18 of the additional compressed air inlet device 9 and the powder outlet 3 of the dense phase powder pump 1.

The control device 90 is in particular designed to supply additional conveying compressed air into the powder path between the powder outlet valve 8 and the powder outlet 3 of the dense phase powder pump 1 in pulses by way of the additional compressed air inlet device 9. Proven to be advantageous here is for the additional conveying compressed air being supplied into the powder path in pulses by the additional compressed air inlet device 9 to always be fed in over the entire or during a predetermined or predefinable partial period of the intake phase of the powder conveying chamber 4 in order to in this way effectively prevent or respectively minimize pulsations in the flow of powder dispensed by the dense phase powder pump 1.

To this end, the control device 90 is specifically designed to then always fluidly connect the air exchange opening 21 of the compressed air chamber 19 of the additional compressed air inlet device 9 to the compressed air source 58 when the powder outlet valve 8 is closed.

In the embodiment of the inventive powder spray coating device 100 depicted in FIG. 3, the individual compressed air supply lines 50, 54, 56 and 59 run into a control unit 91 which coordinates and controls the compressed air supply of the individual components of the powder spray coating device 100. The control unit 91 can in particular also regulate the volume of additional compressed air supplied to the powder spray coating gun 102 per unit of time via the compressed air inlet 106 of the powder spray coating gun 102 which serves in atomizing, forming and/or otherwise influencing the coating powder to be sprayed by the powder spray coating gun 102 and/or the amount of electrode flushing air supplied to the powder spray coating gun 102 per unit of time via the compressed air inlet 107 of the powder spray coating gun 102.

As can be seen in particular from the schematic representation provided in FIG. 3, it is advantageous for the components used to supply the additional compressed air into the powder path to be structurally identical to the components of the powder conveying chamber which supply conveying compressed air into the powder conveying chamber 4 during the discharge phase. The term "structurally identical" as used here particularly refers to the size and the structure of the filter tube 17 used in the additional compressed air inlet device 9 and the filter 10 used in the powder conveying chamber 4. Doing so ensures that the conveying compressed air introduced into the powder conveying chamber 4 during the discharge phase experiences the same pneumatic resistance as the additional compressed air fed into the powder path downstream of the powder outlet valve 8 via the additional compressed air inlet device 9 during the powder intake phase.

The inventive solution is not limited to a dense phase powder pump 1 having a powder inlet 2 at a first end region and a powder outlet 3 at an oppositely disposed second end region as shown in the depictions according to FIGS. 1 to 3. The inventive solution is in fact also suited to embodiments in which—as shown schematically in FIG. 4—the at least one powder conveying chamber 4 of the dense phase powder pump 1 exhibits a powder channel 30 at one end region which serves both as a powder inlet as well as a powder outlet for the powder conveying chamber 4.

Figure 4:
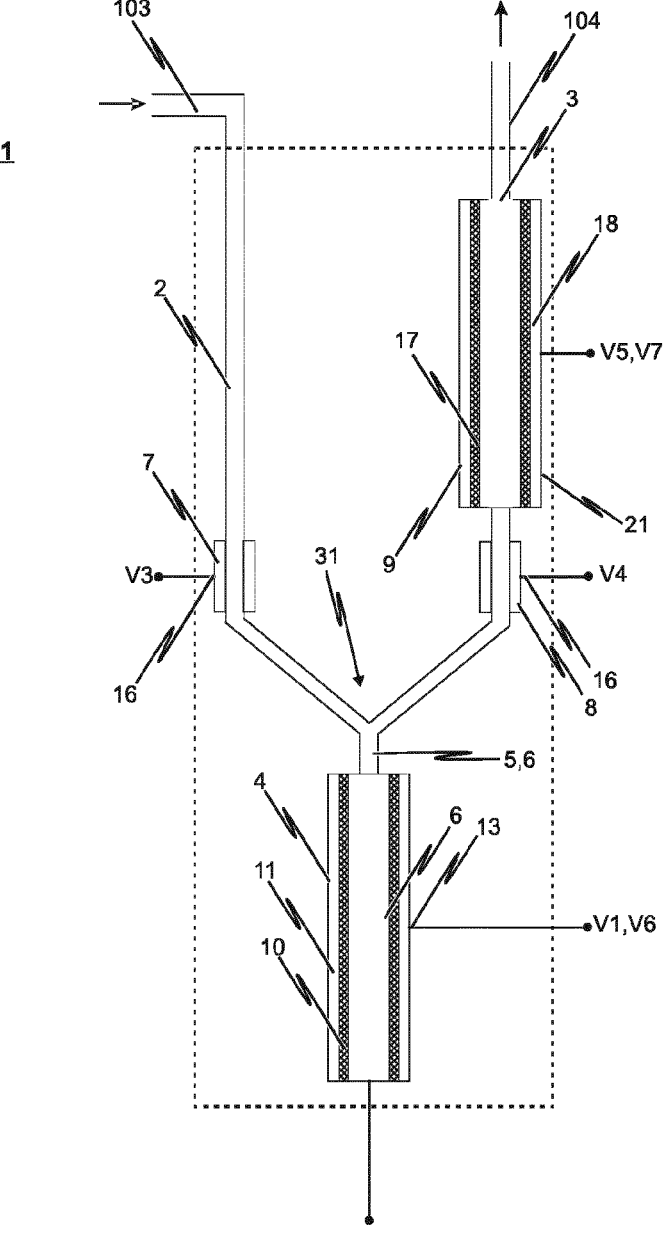
FIG. 4 is a schematic representation of a third exemplary embodiment of the inventive dense phase powder pump.

In the embodiment depicted in FIG. 4, the powder inlet 2 of the dense phase powder pump 1 is fluidly connected to the powder channel 30 of the powder conveying chamber 4 via powder inlet valve 7 and the powder outlet 3 of the dense phase powder pump 1 via powder outlet valve 8. Particularly utilized to that end here is a manifold 31 which in the embodiment depicted in FIG. 4 is configured as a Y-fitting. The powder channel 30 of the powder conveying chamber 4 is fluidly connected to the powder inlet valve 7 on the one hand and to the powder outlet valve 8 on the other by means of said manifold 31.

In the embodiment of the dense phase powder pump 1 depicted schematically in FIG. 4, the additional compressed air inlet device 9 is preferably configured identically or respectively structurally identical to the conveying compressed air inlet device of the powder conveying chamber 4 in order to equalize the pneumatic resistances occurring during the introduction of the conveying compressed air and the introduction of the additional compressed air.

The structure and functioning of the other components of the embodiment depicted in FIG. 4 correspond to the components of the embodiments according to FIGS. 1 to 3, whereby reference is made in this context to the previous remarks.

The present disclosure is not limited to the embodiments of the inventive dense phase powder pump depicted in the drawings but rather yields from an integrated overall consideration of all the features disclosed herein.

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, alignment or shape variations induced by thermal, rotational or vibrational operational conditions, and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A dense phase powder pump for conveying coating powder from a first powder reservoir to a downstream second powder reservoir or a downstream powder spray coating gun, wherein the dense phase powder pump comprises a powder conveying chamber which is fluidly connected or connectable to the first powder reservoir via a powder inlet and to the second powder reservoir or the downstream powder spray coating gun via a powder outlet, wherein at least one powder inlet valve is provided at the powder inlet and at least one powder outlet valve is provided at the powder outlet, wherein the at least one powder inlet valve and the at least one powder outlet valve are each configured as a pinch valve comprising a flexible elastic hose as a valve channel that can be squeezed by actuating compressed air in a pressure chamber surrounding the respective flexible elastic hose in order to close the respective valve, and are each configured to return to an initial state in the absence of a differential pressure to an ambient pressure in the pressure chamber surrounding the respective hose, said initial state of the flexible elastic hose defining the corresponding open state of the respective valve, the dense phase powder pump characterized in that:

the at least one powder inlet valve and the at least one powder outlet valve each exhibit a flow cross section in the respective open state having a two-dimensional area less than a two-dimensional area flow of a flow cross section of the powder conveying chamber, where a flow cross section of any part is defined as a cross section taken through a plane orthogonal to a flow direction through that part;

the at least one powder inlet valve exhibits a flow cross section in the respective open state having a two-dimensional area which corresponds to at least 35% of the two-dimensional area of the flow cross section of the powder conveying chamber; and the dense phase powder pump is configured as a single-chamber dense phase powder pump and comprises only one single powder conveying chamber for conveying coating powder.

2. The dense phase powder pump according to claim 1, wherein the at least one powder inlet valve and the at least one powder outlet valve exhibit an identical effective flow cross section in the respective open state.

3. The dense phase powder pump according to claim 1, wherein the flow cross section of the at least one powder inlet valve in the open state which is larger than the flow cross section of the at least one powder outlet valve in its open state.

4. The dense phase powder pump according to claim 3, wherein the flow cross section of the at least one open powder inlet valve is configured at least 50% larger than the flow cross section of the at least one open powder outlet valve.

5. The dense phase powder pump according to claim 3, wherein the flow cross section of the at least one open powder inlet valve is configured at least 100% larger than the flow cross section of the at least one open powder outlet valve.

6. The dense phase powder pump according to claim 3, wherein the flow cross section of the at least one open powder inlet valve is configured at least 250% larger than the flow cross section of the at least one open powder outlet valve.

7. The dense phase powder pump according to claim 1, wherein the single powder conveying chamber comprises the powder inlet at a first end region and the powder outlet at an oppositely disposed second end region, wherein the at least one powder inlet valve and the at least one powder outlet valve are arranged at respective opposite end regions of the single powder conveying chamber.

8. The dense phase powder pump according claim 1, wherein the single powder conveying chamber comprises a powder channel at one end region which serves both as a powder inlet as well as a powder outlet, wherein the at least one powder inlet valve and the at least one powder outlet valve are each provided in said powder channel.

9. The dense phase powder pump according to claim 8, wherein a manifold, is a Y-fitting, and is further provided to fluidly connect the powder channel of the single powder conveying chamber to the at least one powder inlet valve on the one hand and to the at least one powder outlet valve on the other hand.

10. The dense phase powder pump according to claim 1, wherein a control device is further provided for controlling the at least one powder inlet valve and/or the at least one powder outlet valve as well as for alternatingly generating a positive pressure and a negative pressure in the powder conveying chamber.

11. The dense phase powder pump according to claim 8, wherein the at least one powder inlet valve and the at least one powder outlet valve are separately controllable.

12. The dense phase powder pump according claim 1, wherein a control device is provided which is configured to alternatingly connect at least one air exchange opening of the powder conveying chamber to a vacuum line or vacuum source for drawing coating powder into the powder conveying chamber through the at least one open powder inlet valve while the at least one powder outlet valve is closed, or to a compressed air line or a compressed air source for pneumatically expelling a portion of powder from within the powder conveying chamber through the at least one open powder outlet valve while the at least one powder inlet valve is closed.

13. The dense phase powder pump according to claim 1, wherein at least one additional compressed air inlet device further leads to one point in the powder path for supplying additional compressed air as additional conveying compressed air when needed.

14. The dense phase powder pump according to claim 13, wherein the additional compressed air inlet device is designed to pulsatively introduce additional compressed air into the powder path.

15. The dense phase powder pump according to claim 14, wherein the point in the powder path is between the powder outlet valve and the powder outlet of the dense phase powder pump.

16. The dense phase powder pump according to claim 1, wherein the at least one powder outlet valve exhibits a flow cross section in the respective open state which corresponds to at least 35% of the flow cross section of the powder conveying chamber.

\* \* \* \* \*